United States Patent Office 2,882,809
Patented Apr. 21, 1959

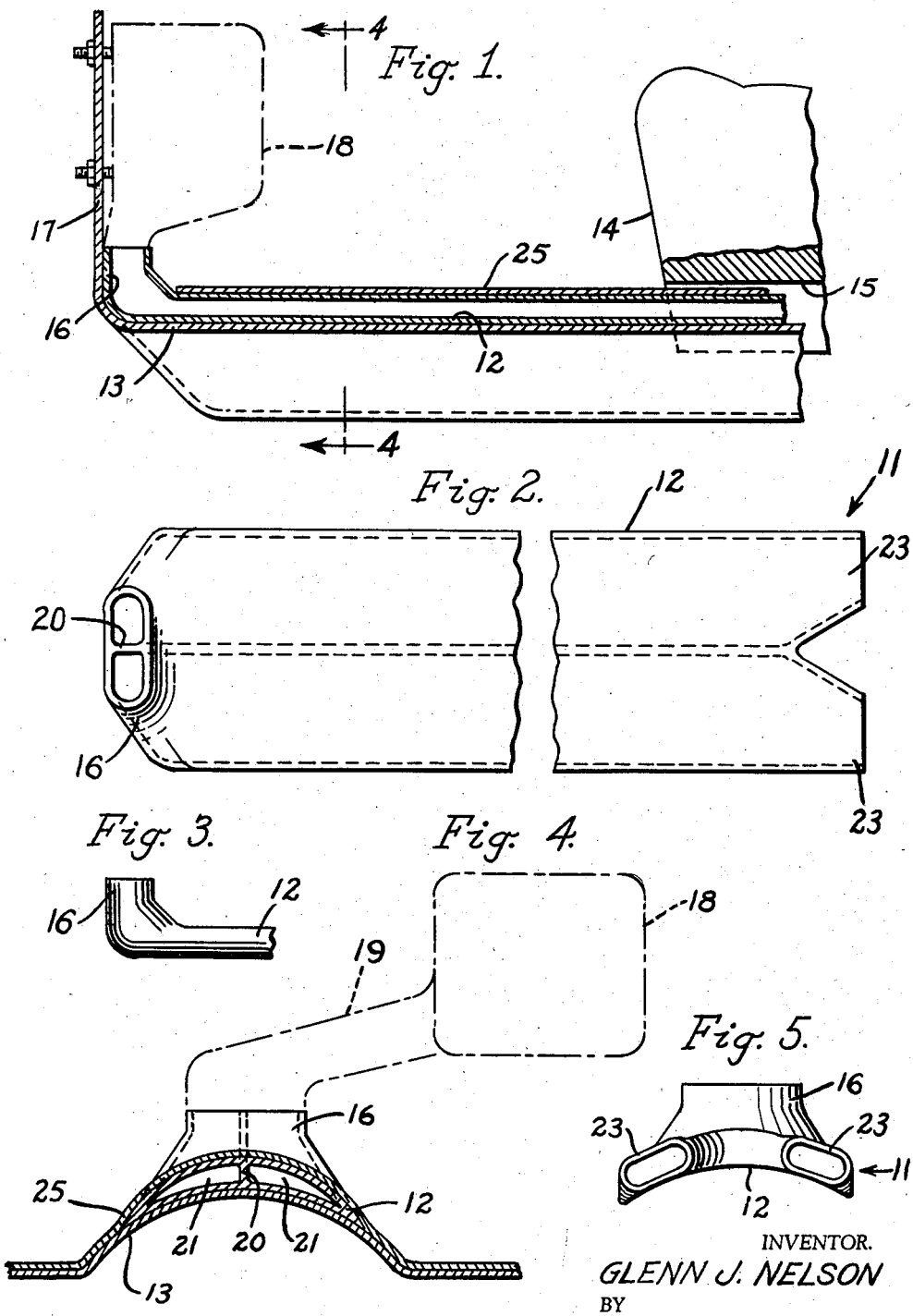

2,882,809
AIR DUCT FOR MOTOR VEHICLES
Glenn J. Nelson, Louisburg, Minn.
Application September 17, 1957, Serial No. 684,520
1 Claim. (Cl. 98—2)

This invention relates to motor vehicle accessories, and more particularly to an air duct for transmission of hot or cold air from a temperature controlling unit in a motor vehicle.

A main object of the invention is to provide a novel and improved air duct attachment adapted to be mounted on the longitudinally extending floor tunnel of a motor vehicle, said air duct attachment being simple in construction, being relatively compact in size, and providing a means for transmitting hot or cold air from the temperature controlling unit of the motor vehicle to the rear portion of the passenger compartment thereof.

A further object of the invention is to provide an improved air duct attachment adapted to be mounted on the floor tunnel of a motor vehicle, said air duct attachment being inexpensive to manufacture, being sturdy in construction, and being arranged so that it may be mounted directly on the drive shaft tunnel of the floor of the motor vehicle beneath the floor mat in a manner wherein it is substantially concealed and whereby it occupies a minimum amount of space.

Further objects and advantages of the invention will become apparent from the following description and claim, and from the accompanying drawings, wherein:

Figure 1 is a longitudinal vertical cross sectional view taken through an improved air duct attachment installed in a motor vehicle in accordance with the present invention.

Figure 2 is a fragmentary top plan view of the air duct attachment employed in Figure 1.

Figure 3 is a side elevational view of one end portion of the air duct attachment, adapted to be connected to the air temperature controlling unit of the motor vehicle.

Figure 4 is a transverse vertical cross sectional view taken on the line 4—4 of Figure 1.

Figure 5 is a rear end elevational view of the air duct attachment of Figures 1 to 4.

Referring to the drawings, 11 generally designates an air duct attachment according to this invention. The air duct attachment 11 comprises a hollow relatively thin, downwardly concave tubular body 12 having tapering side edges and shaped to fit closely over the floor tunnel 13 of a motor vehicle and to merge smoothly with the opposite sides of the tunnel, said body being of sufficient length to extend beneath the bottom surface 15 of the vehicle front seat 14 with the forward end portion 16 of the attachment engaged against the vehicle fire wall 17, as shown in Figure 1. The forward end portion of the body 12 comprises an upwardly extending, upwardly tapering intake conduit adapted to be connected to the outlet of a conventional motor vehicle air temperature controlling unit, such as a conventional heater 18, shown in dotted view in Figure 1.

As shown in Figure 4, the heater 18 may be offset to one side of the motor vehicle, but the heater will be ordinarily provided with an outlet duct 19 which is adapted to be connected to the upwardly extending intake portion 16 of the body 12.

Designated at 20 is a vertical, longitudinal extending partition wall integrally formed in the body 12 along its longitudinal vertical central plane, dividing the body into a pair of side-by-side ducts 21, 21. The vertical partition wall 20 extends substantially for the entire length of the body 12 and serves as a means for rigidifying the body so that it can sustain substantial weight at its crown portion.

The rear end of body 12 is formed with the convergent outlet duct portions 23, 23 having rearwardly diverging inner side wall portions serving to discharge the transmitted air outwardly toward the opposite sides of the rear portion of the passenger compartment of the vehicle, whereby to provide a more uniform distribution of the air than would be otherwise obtained.

As is clearly shown in Figures 1 and 4, the attachment 11 is installed on the floor tunnel 13 in closely fitting, overlying relationship thereto, and the motor vehicle floor mat 25 is disposed over the attachment except for its discharge end, covering the attachment, so that the main portion of the attachment is completely hidden.

By using the attachment 11, the air from the unit 18 is transmitted first to the rear portion of the vehicle, since the body 12 is preferably of sufficient length to extend completely beneath the front seat 14 of the vehicle, whereby air will be discharged into the rear portion of the vehicle passenger compartment and will be allowed to circulate forwardly therefrom, providing more uniform and effective air temperature control of the vehicle passenger compartment than has been heretofore obtained.

The air duct attachment 11 may be made of any suitable material, and the length of the body 12 of the duct may be such as to provide the most suitable distribution of air to the rear portion of the passenger compartment of the vehicle.

Obviously, the intake end portion 16 may be employed with various adapters for connecting same to the outlet of various types of motor vehicle heaters employed on the fire wall 17, or other types of air temperature modifying units, such as air conditioning units or the like.

While a specific embodiment of an improved air transmission duct for a motor vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In combination, a motor vehicle having a front seat and a longitudinally extending floor tunnel over the drive shaft of the vehicle and extending beneath said front seat, an air duct for transmitting air from an air temperature controlling unit mounted on the fire wall of the vehicle, said duct comprising a hollow, relatively thin, longitudinally extending, downwardly concave tubular body of substantial width shaped to fit closely over and nestingly receive said floor tunnel and being of sufficient length to extend beneath the vehicle front seat, said body having tapering side edges merging with the opposite sides of the tunnel, said body being provided at its forward end with an upwardly extending and upwardly tapering intake portion adapted to be connected to the air temperature controlling unit, a longitudinal vertical partition wall in said body extending substantially the entire length thereof and defining a pair of side-by-side air passages in said body, and respective rearwardly tapering discharge conduits at the rear ends of said air passages, the inner side walls of said discharge conduits diverging rearwardly, whereby air discharged from said passages is deflected laterally outwardly toward the opposite side portions of the portion of the vehicle rearwardly of the front seat.

References Cited in the file of this patent

UNITED STATES PATENTS

| | | |
|---|---|---|
| 1,870,374 | Mihaliak | Aug. 9, 1932 |
| 1,966,882 | Bucklen | July 17, 1934 |
| 2,045,826 | Benolken | June 30, 1936 |
| 2,241,755 | Zaccone | May 13, 1941 |
| 2,382,712 | Hans | Aug. 14, 1945 |
| 2,493,122 | Emerich | Jan. 3, 1950 |